2,824,768

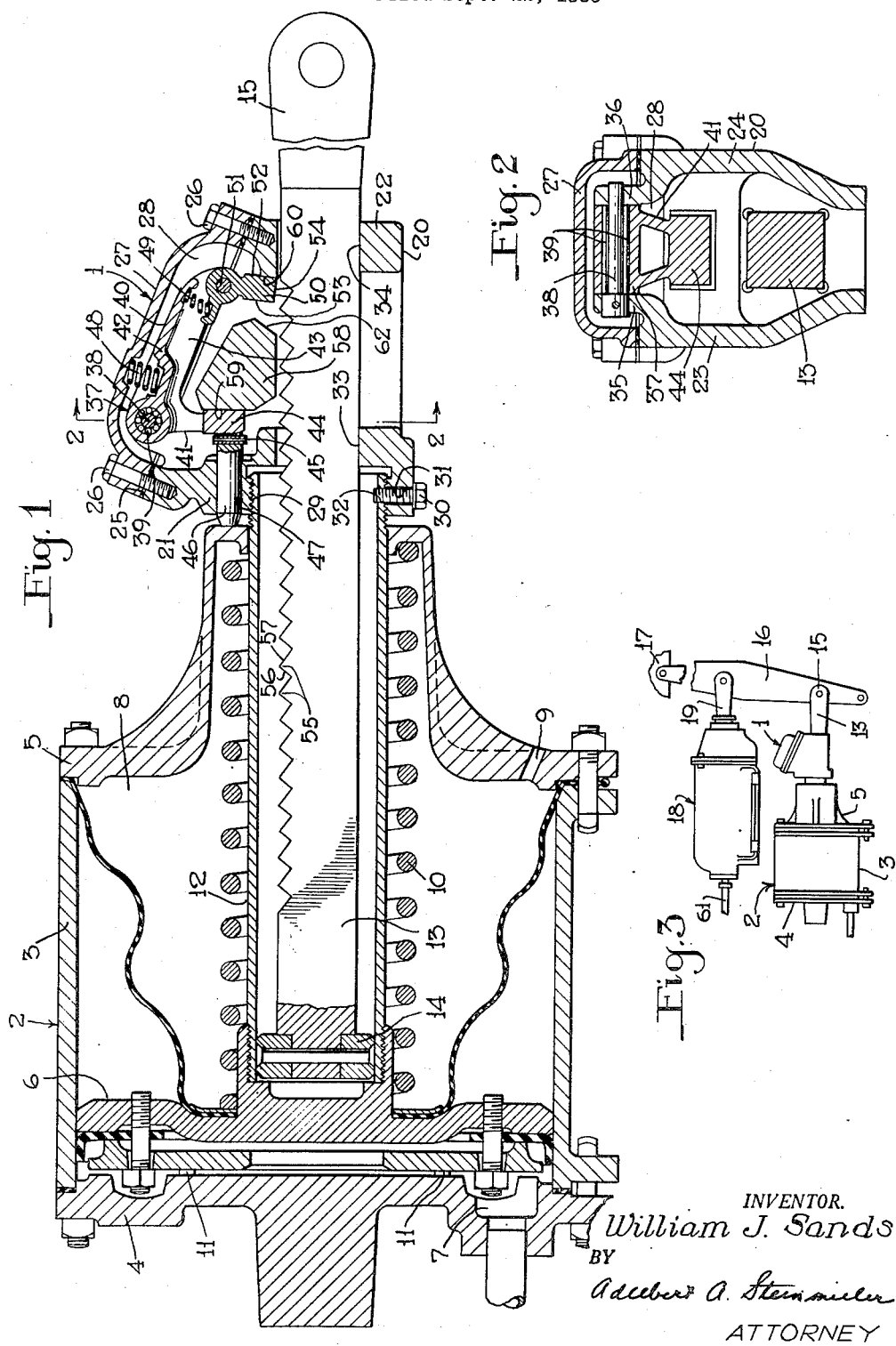
Feb. 25, 1958  W. J. SANDS  2,824,768
BRAKE CYLINDER LATCH ARRANGEMENT FOR EMPTY
AND LOAD BRAKE EQUIPMENT
Filed Sept. 22, 1955
INVENTOR.
William J. Sands
BY
Adelbert A. Steinmuller
ATTORNEY

United States Patent Office 2,824,768
Patented Feb. 25, 1958

BRAKE CYLINDER LATCH ARRANGEMENT FOR EMPTY AND LOAD BRAKE EQUIPMENT

William J. Sands, East McKeesport, Pa., assignor to Westinghouse Air Brake Company, Wilmerding, Pa., a corporation of Pennsylvania Application September 22, 1955, Serial No. 535,888

9 Claims. (Cl. 303—6)

This invention relates to brake cylinder latch arrangements for empty and load brake equipments of the type used on railway freight cars and the like, and more particularly relates to an improved latch arrangement of the above type embodying a novel latch device for controlling connection of the usual load brake cylinder piston rod with the usual toothed push rod employed in equipments of this type.

A brake cylinder latch device in present day common use is shown and described in U. S. Patent No. 2,004,654, granted June 11, 1935, to C. C. Farmer and assigned to the assignee of the present application. This latch device comprises a latch which, when brakes are released, is held in a disengaged position against opposition of a relatively strong helical spring through the medium of an unlatching pin which then abuttingly engages the non-pressure head of the brake cylinder; and, as the latch device is carried away from said non-pressure head by the brake cylinder piston rod during an application of brakes, the latch is rocked by said spring into engagement with a toothed push rod. Since the position of the push rod at the moment of initial engagement of the latch therewith is dependent upon the degree of prior movement of said push rod in the usual manner by and during operation of the empty brake cylinder device to take-up of slack in the brake rigging, and apply an initial braking force, the latch (which is then moving arcuately toward the teeth and at the same time longitudinally away from said non-pressure head with the moving latch device) may engage and seat against the push rod behind, but near the tip of, one of the teeth thereon and thus form an insecure locking connection between the piston rod and push rod. If and when this occurs, the force exerted by fluid pressure on the piston and transmitted via the piston rod to the latch may cause the latch to break away from the push rod and rake over and shear off the teeth of the push rod, instead of transmitting this force to the push rod for applying additional braking force to the brake rigging, which is of course undesirable.

It is therefore one object of this invention to provide an improved brake cylinder latch arrangement embodying novel means for insuring full engagement of an improved latch with one of the teeth on a brake cylinder push rod each time the load brake cylinder is charged and for insuring disengagement of the latch from the push rod when the load brake cylinder is vented.

Another object is to provide an improved brake cylinder latch arrangement of the above type embodying a novel latch device which will not rake the teeth of the push rod during either an application or a release of brakes.

According to the foregoing objects, the improved latch arrangement embodies a novel latch device comprising a bell crank operably carried by the piston rod and rockable in a direction lengthwise of the push rod; one of the arms of the bell crank normally being engaged by an unlatching pin for holding said bell crank in a position for disengaging a latch from the push rod teeth against opposition of a relatively strong spring. The latch is pivotally connected to the other, preferably longer arm of the bell crank, for movement in the aforementioned direction and is urged by a light spring into contact with a stop that is spaced in a direction away from the piston, from a thrust transmitting member operably carried by the piston rod, so that initial contact of the latch with the push rod will be made at a maximum distance from said thrust member and permit sufficient time during outward movement of the bell crank and member for the latch to fully and positively engage the push rod teeth before said thrust member engages the latch and thereby provides a solid thrust connection between the piston rod and push rod.

Other objects and advantages will become apparent from the following more detailed description of the invention and from the accompanying drawing, wherein Fig. 1 is a view, partly in section and partly in outline, of a latch device embodying the invention, shown associated with a load brake cylinder device; Fig. 2 is a sectional view, taken along the line 2—2 of Fig. 1; and Fig. 3 is an outline view of the load brake cylinder device and latch device of Fig. 1 shown in relation to other components of an empty and load brake equipment.

Description

As shown in the drawing, the reference numeral 1 designates a latch device embodying the invention; and numeral 2 designates a load brake cylinder with which, for purposes of illustration, said latch device is associated.

The brake cylinder device 2 may be of well-known construction, comprising a hollow cylindrical housing 3 closed at one end by the usual pressure head 4 and at the opposite end by a non-pressure head 5. Within the housing 3 is slidably mounted a piston 6 and at the side of said piston nearest the pressure head 4 is the usual pressure chamber 7; and at the opposite side is the usual non-pressure chamber 8, which is open to atmosphere via a vent port 9. A helical piston return spring 10, disposed in chamber 8 and interposed between the head 5 and piston 6, urges said piston to a brake release position, in which it is shown in Fig. 1 of the drawing. Stop elements 11 are provided on the end wall of chamber 7 for contact with piston 6 to define its brake release position, which position will be assumed when pressure chamber 7 is devoid of fluid under pressure.

The spring 10 encircles a tubular piston rod 12, which is operably connected at one end to the piston 6 and extends through the non-pressure chamber 8 and at the opposite end projects exteriorly of the non-pressure head 5. A push rod 13, preferably of square or rectangular cross-section, is accommodated within the tubular piston rod 12 and extends exteriorly thereof through the open end of said piston rod. Suitably secured to the push rod 13 about its inner end is a push rod support ring 14 which slidably engages the inner wall of the piston rod 12 during longitudinal movement of the push rod relative to the piston rod; the opposite end of the push rod being provided with a head 15 pivotally connected through the medium of a pin to a brake lever 16 (Fig. 3) which may, for the sake of illustration, be pivotally fulcrumed at one end about a fixed member 17 and at the opposite end is adapted for connection to brake shoes (not shown) arranged for contact with the vehicle wheels.

As shown in Fig. 3, the conventional empty and load brake equipment may comprise an empty brake cylinder device 18 having a push rod 19 which is substantially parallel to the push rod 13 and is pivotally connected to the lever 16 in spaced relation to the push rod 13 and so arranged that upon pressurization of the respective pressure chambers of the empty and load brake cylinder devices 18, 2, the corresponding push rods 19, 13 will apply cumulative forces to the brake lever 16, in the usual manner.

According to the invention, the latch device 1 comprises a hollow body 20 enclosed by end walls 21, 22 spaced apart in a direction along the axis of the push rod 13, and also enclosed by side walls 23, 24 (Fig. 2) joining said end walls; said body being open at the top, as viewed in Figs. 1 and 2 of the drawing. The upper surfaces of the walls 21, 22, 23, 24, are inclined generally toward the head 15 of push rod 13 so as to provide an inclined planar mounting surface 25 to which is suitably mounted, as by cap screws 26, a removable generally inverted bowl-shaped cover 27 that encloses the top of the body 20 and cooperates with the respective walls to define a chamber 28. End wall 21, which is nearer the piston 6 than end wall 22, has a circular recess 29 that faces in the direction of said piston and is provided with screw threads whereby the body 20 is removably secured to the externally threaded outermost part of the piston rod 12. The body is locked against rotation relative to the piston rod 12 by a suitable locking screw 30 that passes through a bore 31 extending radially through the end wall 21 to the recess 29 and projects beyond said bore and has screw-threaded engagement within an alignable, threaded radial bore 32 through the piston rod. The end walls 21, 22 have aligned through openings 33, 34, respectively, which are arranged coaxially with, and of smaller cross-section than, the recess 29 and are of the same configuration as the cross-sectional configuration of push rod 13 for slidably guiding and supporting said push rod intermediate its ends.

Two spaced arms 35, 36 (Fig. 2) preferably formed integrally with side walls 23, 24 project upwardly within the confines of the cover 27. Between these arms is disposed the knee of a bell crank 37 that is supported by a fulcrum pin 38 carried by said arms and extending transversely of the push rod 13 so as to permit rockable movement of said bell crank about said pin relative to the body 20 in a direction lengthwise of said push rod. Roller bearings 39 are preferably interposed between the bell crank knee and pin 38 so as to assure substantially friction-free rockable movement of the bell crank 37.

As shown in Fig. 1 of the drawing, the bell crank 37 comprises two arms 40, 41 so projecting from the bell crank knee as to define between them an acute included angle. Arm 40 extends angularly downward and outward in the general direction of the push rod head 15 and comprises a central or spring seat portion 42 and to each transverse side thereof an integrally formed pin supporting portion 43 (only one of which is shown); these portions 43 extending downwardly on each side of said central portion 42 such as to give the arm 40 a generally inverted U-shaped cross-section, with the open end of the U facing generally toward the inner end of the push rod 13. Arm 41 extends downwardly at substantially right angles to the push rod 13, and at its lower end has a preferably integrally formed operating lug 44 that is spaced from the inner surface of the end wall 21, that is, from the surface facing chamber 28. The operating lug 44 is adapted to abuttingly engage the enlarged head 45 of an unlatching pin 46 that is slidably mounted in a suitable bore 47 through end wall 21; said bore being so arranged that its axis, and hence the axis of pin 46, is parallel to the axis of piston rod 12. The unheaded end of pin 46 is adapted to extend exteriorly of bore 47 and abuttingly engages the adjacent end of the non-pressure head 5.

A relatively heavy helical spring 48, interposed between the cover 27 and upper side of central portion 42 of bell crank arm 40, biases the bell crank 37 in a clockwise direction, as viewed in Fig. 1 of the drawing, for urging the operating lug 44 into contact with the head 45 of pin 46. A relatively light helical spring 49 is preferably interposed, for reasons hereinafter to be explained, between the under side of central portion 42 and a projection formed integrally with a latch 50 that is pivotally connected to the bell crank arm 40 through the medium of a pin 51. The pin 51 is supported adjacent its respective ends within suitable aligned bores through the pin supporting portions 43 of arm 40, and the axis of pin 51 is parallel to the axis of pin 38.

The latch 50 has two parallel surfaces 52, 53 which extend generally in the direction of the pin 51, and also has a flat lowermost surface 54 that is preferably perpendicular to and joins the surfaces 52, 53. The side of the rectangular push rod 13 facing the latch 50 has teeth, designated generally by their reference numeral 55 and formed by substantially V-shaped notches cut in parallel rows transversely across the push rod; the included angle between the inclined sides of these notches preferably being a right angle. The respective teeth 55 comprise thrust faces 56 and non-thrust faces 57 which are adapted to be engaged by the surfaces 52, 54 of the latch 50, respectively; each thrust face extending from the apex or tip of the respective tooth in a direction toward the piston 6, and each such non-thrust face extending from said apex in a direction away from the piston 6.

A combination stop and thrust member 58, preferably formed integrally with the body 20, extends from side wall 23 to side wall 24 above the push rod teeth 55 and intermediate the end walls 21, 22. The member 58 has a stop surface 59 that is substantially perpendicular to the axis of the push rod 13 and is engageable by the lug 44.

In operation, assume initially that the pressure chamber 7 of the load brake cylinder device 2 and also the pressure chamber (not shown) of the empty brake cylinder device 18 (Fig. 3) are devoid of fluid under pressure.

Under this condition, the push rod 13 will be in its innermost position within the piston rod 12; the piston 6 and hence piston rod 12 will be in their innermost positions under action of return spring 10; and the latch body 20, which is operably connected to the piston rod, will consequently be in such close proximity to the non-pressure head 5 that the latter, acting through the medium of the unlatching pin 46, will hold the operating lug 44 in abutting contact with the stop surface 59 of member 58, for thereby holding the bell crank 37 in a latch disengaging position, in which it is shown in the drawing, against resistance of the spring 48. With the bell crank 37 in this position, the pin 51 carried thereby will be disposed at its greatest distance from the push rod 13, for effecting complete disengagement of the latch 50 from the push rod; and also the spring 49, which biases the latch 50 in a counterclockwise direction relative to the bell crank arm 40, will cause the surface 52 of latch 50 to contact a stop 60 formed on the inner surface of end wall 22.

Hence under the assumed condition, all of the parts of the empty and load brake equipment will be in the respective positions in which they are shown in the drawing.

To effect an application of brakes, fluid under pressure is supplied via a pipe 61 (Fig. 3) to the empty brake cylinder device 18 for causing the push rod 19 to be moved outwardly and thereby effect counterclockwise pivotal movement of the brake lever 16 about the fixed member 17 to first take up slack in the brake rigging (not shown) and then bring the brake shoes (not shown) into engagement with the car wheels for initial application of a braking force thereto. As the brake lever thus pivots, it will pull the load brake cylinder push rod 13 outwardly to an extended position, while the piston 6 and hence piston rod 12 of load brake cylinder device 2 will remain in brake release position.

In loaded car braking, after the initial pivotal movement of the brake lever 16 and consequent actuation of the push rod 13 to extended position, fluid under pressure will be supplied in the usual manner to the pressure chamber 7 of the load brake cylinder device 2 for causing the piston 6 and hence piston rod 12 to move outwardly against resistance of return spring 10, it being noted that with the push rod 13 extended, as above described, the piston 6 during its outward movement will not effect any outward movement of said push rod.

According to the invention, as the piston rod 12 moves outwardly, as just described, it carries the latch device 1 away from the non-pressure head 5, slidably moving the latch body 20 relative to the unlatching pin 46, which is initially held stationary in abutting contact with said non-pressure head by pressure of the spring 48 acting through the medium of the bell crank 37 and operating lug 44. As the body 20 and hence the bell crank 37 are thus carried outwardly, the latter will be rocked in a clockwise direction about the fulcrum pin 38.

Meanwhile, as the bell crank 37 is being rocked about pin 38 and carried outwardly by the body 20, the pin 51 will be correspondingly moved and thus carry the latch 50 toward engagement with one of the teeth 55 of the then stationary push rod 13; said latch sliding downwardly in contact with the stop 60, due to the pressure of spring 49, until the latch contacts the push rod. Since the location of the push rod teeth 55 relative to the latch 50 will depend upon the extent of previously described prior outward movement of the push rod 13 by the brake lever 16, the latch may initially contact one of the push rod teeth 55 at various places, as will now be discussed.

If the latch 50 initially contacts the tip or apex of one of the teeth 55, arcuate movement of the bell crank and hence of pin 51 toward the push rod 13 will temporarily cease, while the bell crank 37 will continue to move outwardly with the body 20 relative to the push rod and carry the latch pin 51 and latch outwardly. During such outward movement of the pin 51, the pressure of spring 48 will hold the latch 50 in contact with the tip of the particular tooth and hence the latch will usually pivot or be fulcrumed in a clockwise direction about the place of contact with said tooth, such that the latch surface 54 will tend to become parallel with the non-thrust face 57 of the particular tooth; and when the pin 51 is moved sufficiently outward relative to the tip of said tooth, the latch 50 will be forced by pressure of spring 48 into full seating engagement with the push rod 13, such that latch surfaces 54, 52 will seat against the non-thrust and thrust faces 57, 56, respectively, of adjacent push rod teeth.

Meanwhile, during this outward movement of the latch body 20 and pin 51, the combination stop and thrust member 58 will be correspondingly moved, such that by the time the latch 50 is fully seated, as just described, an inclined thrust surface 62, that is formed on the member 58 in spaced relation from, and generally opposite to, the stop 60 and is parallel to the respective thrust faces 56 of the push rod teeth 55, will be substantially in engagement with the latch surface 53. During further outward movement of the piston rod 13 and hence latch body 20 and member 58, the surface 62 will solidly engage the surface 53 of latch 50; and then the force exerted by fluid pressure in chamber 7 on the piston 6 will be transmitted to the push rod 13 via a "solid" thrust connection including the piston rod 12, the latch body 20, the thrust member 58, and the latch 50 for applying additional braking force through the medium of the brake lever 16 as the piston rod 12 continues its outward movement.

If initial contact of the latch 50 with the push rod 13 is so made that a part of latch surface 54 near the latch surface 52 engages the tip of a tooth, then the latch 50 may be carried outwardly by pin 51, initially sliding longitudinally along said tip, until the place of contact with said tip is moved nearer to surface 53; whereupon the latch will pivot as above described and thereafter fully engage the push rod.

If initial contact of the latch 50 with the push rod 13 is made by the corner of latch surfaces 54, 52 contacting the thrust face 56 of a tooth slightly below the tip of said tooth, the latch may fulcrum about the point of such contact against the light resistance of spring 49 and be dragged over said tip by outward movement of the pin 51; and thereafter the latch will pivot and be fully seated, as under the condition first described. But, if the initial contact of the latch 50 is made sufficiently below the tip of a tooth so that the latch gets a "hold" against the tooth, the latch will usually be pivoted as the pin 51 moves outwardly, until the latch surfaces 52, 54 become parallel to the thrust and non-thrust faces 56, 57 of adjacent teeth; whereupon the latch will be fully engaged by pressure of spring 48, as above described, without being dragged over the tip of the particular tooth.

Under an unusual condition, the latch 50 may move uninterruptedly into full seating engagement with the push rod; such condition occurring when the push rod teeth 55 are so disposed that the latch surfaces 52, 54 make initial contact with adjacent tooth surfaces 56, 57.

According to features of the invention, the unlatching pin 51 is carried by the bell crank 37 at a considerably greater distance from the fulcrum pin 38 than the operating lug 44, which is preferable for two reasons: First, due to the difference in leverage, only slight outward movement of the body 20 relative to the unlatching pin 46 will be required to bring the latch into engagement with the push rod and the latch will therefore have more time than in arrangements heretofore proposed to seek and attain full engagement with the push rod, as said body continues to move outwardly. Second, the longer bell crank arm 40 provides added moment for assuring prompt and complete disengagement of the latch from the push rod, when the bell crank 37 is rocked by the unlatching pin 46 in a counterclockwise direction during a release of brakes, hereinafter to be described.

It should also be noted that the thrust surface 62 of member 58 is spaced a considerable distance from the stop 60. This provides the requisite space for the latch to operate under the various conditions of initial contact above described. The spring 49 is desirable, though not absolutely required, to assure that the latch 50 will be biased into engagement with the stop 60 and move downwardly along said stop until initial contact is made; gravity being deemed unreliable because the railway car may be on a grade. It will be apparent that without the spring 49 the latch may contact a tooth nearer the member 58 than desired, such that the latter during its outward carriage by the latch body 20 may "catch" the latch before it is fully engaged and this could cause shearing off of the push rod teeth when force is applied to the partially engaged latch through the medium of the piston rod.

Moreover, it will be noted that there is what may be termed a double pivotal connection between the unlatching pin 46 and the latch 50, whereby the bell crank 37 is rocked about fulcrum pin 38 and the latch is pivotally carried by said bell crank. This permits the latch to pivot relative to the bell crank and, as actual tests have proven, assures full engagement of the latch with the toothed push rod 13 under the various conditions of initial contact above described.

To effect a release of brakes, fluid under pressure is released from the pressure chamber 7 of the load brake cylinder device 2 and then from the pressure chamber of the empty brake cylinder device 18. Consequently, as the pressure chamber 7 of load brake cylinder device 2 is vented, the thrust theretofore exerted by the piston 6 on load brake cylinder push rod 13 will be relieved and hence the brake lever 16 will be pivoted in a clockwise direction due to the resiliency of the brake rigging, causing the push rod 13 to be returned to the particular position to which it had been extended by operation of the empty brake cylinder push rod 19 during the preceding brake application; whereupon the push rod 13 will be maintained in said position because the empty brake cylinder push rod 19 continues to exert thrust on the brake lever 16. Hence, as the latch device 1 is thus carried leftward by the piston rod 12, the push rod 13 will initially be moved a corresponding extent, such that there will be no relative movement between the piston rod 12, latch device 1, and push rod 13, until after the push rod 13 has been returned to the aforementioned particular position, at which time unlatching pin 46 will be substantially in contact with the non-pressure head 5. Thereafter, while the push rod 13 is held stationary and the piston rod 12 and hence bell crank 37 and thrust member 58 are carried leftward, said thrust member will disengage the latch 50 and the bell crank will be rocked in a counterclockwise direction about the leftward moving pin 38 by contact of the lug 44 with the then stationary pin 46. As the bell crank 37 pivots, it will exert a moment via the long arm 40 sufficient to assure prompt disengagement of the latch 50 from the push rod 13 and thereby prevent ratcheting of the latch over the push rod teeth 55, such as would occur if disengagement were protracted; and following such disengagement, spring 49 will bias the latch into contact with stop 60, as will be understood from previous description.

After the latch 50 is fully disengaged and the piston 6 and piston rod 12 are in brake release position, fluid under pressure is released from the empty brake cylinder device 18, thereby causing the empty brake cylinder piston return spring (not shown) acting through the medium of the push rod 19 to effect further pivotal movement of brake lever 16 in a clockwise direction and hence return the load brake cylinder push rod 13 to its innermost position. The various parts will then be in the respective positions in which they are shown in the drawing.

*Summary*

It will now be seen that the improved brake cylinder latch arrangement embodies a novel latch device 1 comprising a bell crank 37 which is fulcrumed at its knee about a pin 38 carried by a latch body 20 that is, in turn, secured to the hollow piston rod 12. Pivotally connected by a pin 51 to the longer arm 40 of the bell crank 37 is a latch 50 that is adapted to engage the teeth 55 of a push rod 13, the axes of the pins 38, 51 being parallel. The latch 50 is normally held disengaged from said teeth by an unlatching pin 46 that acts on the shorter arm 41 of the bell crank against opposition of a relatively strong spring 48, which acts on the bell crank for urging the latch into engaged position.

By virtue of the double pivotal connection between the unlatching pin 46 and latch 50, as afforded by pins 38, 51, and the bias exerted by a light spring 49 on the latch, said latch can freely pivot and will always attain full seating engagement with the push rod teeth 55, before a thrust member 58 carried by the latch body 20 moves into contact with the latch for establishing a "solid" thrust connection of the piston rod 12 with the push rod 13 for applying added braking force to the brake rigging. After inward movement of the push rod 13 is temporarily halted during a release of brakes, slight further inward movement of the piston rod 12 and hence bell crank 37 will cause the unlatching pin 46 to rock the bell crank sufficiently so that the longer arm 40 will effect complete disengagement of the latch from the then stationary push rod without permitting the latch to ratchet over the push rod teeth.

Having now described the invention, what I claim as new and desire to secure by Letters Patent is:

1. In a fluid pressure brake apparatus, the combination with a brake cylinder having a piston and also having a piston rod operable by said piston, and a transversely toothed push rod mounted in and projecting exteriorly of the piston rod, of a latch device comprising body means carried by the piston rod adjacent its projecting end, lever means rockably connected to said body means for arcuate movement in a direction lengthwise of the push rod, latch means pivotally connected to said lever means for arcuate movement in said direction relative to said lever means, unlatching means normally maintaining said lever means in one position for thereby maintaining said latch means disengaged from the push rod, bias means acting on said lever means and effective during initial outward movement of the piston from a brake release position to rock said lever means from said one position for carrying said latch means into engagement with one of the push rod teeth, thereupon causing said latch means during continued outward movement of the piston to so fulcrum on said one tooth and pivot relative to said lever means as to fully seat against said one tooth or the tooth adjacent said one tooth, and thrust transmitting means rigidly carried by said body means and normally spaced from said latch means and effective during subsequent outward movement of the piston following such continued outward movement to successively engage said latch means and then force the latter against the tooth against which it is then fully seated for thereafter transmitting power from the piston to the push rod during further outward movement of the piston.

2. The combination according to claim 1, including a stop carried by said body means and spaced from said thrust transmitting means in a direction away from the piston, and bias means for urging said latch means into contact with said stop when the latch means is disengaged from the push rod, such that initial contact of said latch means with said one tooth will always be made at substantially a preselected maximum distance from said thrust transmitting means.

3. In a fluid pressure brake apparatus, the combination with a brake cylinder comprising a piston slidably mounted in a casing and a piston rod operable by said piston, and a toothed push rod for transmitting power to apply brakes, of a latch device for controlling operative connection of said piston rod with said push rod, said latch device comprising a hollow body secured to a part of the piston rod projecting exteriorly of the casing, bell crank means carried by said body and having two arms extending from a knee portion and fulcrumed at said knee portion for rockable movement in a direction lengthwise of the push rod, latch means pivotally connected to one of said arms for pivotal movement in said direction relative to said one arm, bias means acting on said bell crank means for urging said latch means into engagement with one of said teeth during initial outward movement of the piston from a rest position, thereupon causing said latch means during continued outward movement of the piston to so fulcrum on said one tooth and pivot relative to said one arm as to fully seat against at least said one tooth or the tooth adjacent said one tooth, thrust transmitting means rigidly carried by said body and having a thrust surface carried during subsequent movement of said body away from the casing responsively to pressure of fluid acting on the piston to engage said latch means following such full seating engagement thereof for applying power to the push rod via said latch means, and unlatching means operative by engagement with the casing during return movement of the piston to rest position to engage the other of said arms for rocking said bell crank means against opposition of said bias means to effect disengagement of said latch means from the push rod.

4. The combination according to claim 3, further characterized in that the point of pivotal connection of said latch means with said one arm of the bell crank means is at a substantially greater distance from the axis of rockable movement of said bell crank means than the point of engagement of said unlatching means with said other arm of the bell crank means.

5. Means for controlling connection of a load brake cylinder piston slidably mounted in a casing and its hollow piston rod with a toothed push rod slidably mounted in said piston rod and movable outwardly of the latter by a brake lever to an extended position, said means comprising hollow body means secured to the piston rod and having spaced aligned openings within which the push rod is slidably guided, unlatching pin means slidable relative to said body means and movable in a direction parallel to the piston rod, rockable means pivotally carried by said body means and having two connected arms in spaced relation to the toothed part of the push rod, latch means pivotally connected to one of said arms and engageable with the push rod, said unlatching pin means being operative by engagement with the casing responsively to movement of the piston rod to a brake release position to exert a moment on the other of said arms for rocking said rockable means for effecting disengagement of the latch means from the push rod, spring means exerting an opposing moment on said rockable means for urging said latch means into engagement with one of the push rod teeth during initial outward movement of the piston rod from brake release position, thereupon causing said latch means during continued outward movement of the piston rod to so fulcrum on said one tooth and pivot relative to said rockable means as to fully seat against the adjoining tooth faces of said one tooth and a tooth adjacent said one tooth, and thrust transmitting means positively connected to said body means and normally so spaced from said lach means as to engage said latch means only upon subsequent outward movement of said piston rod and thereby said body means following such full seating of said latch means, said thrust transmitting means being thereafter effective during further outward movement of said piston rod to apply power to the push rod via said fully seated latch means.

6. In combination, a brake lever, fluid pressure responsive means for operating said lever to take up slack in the brake rigging, a push rod movable by said lever to an extended position during such take-up of slack and having transverse teeth each of which teeth comprises a thrust face and a non-thrust face, a brake cylinder device comprising a piston slidably mounted in a casing and a hollow piston rod carried by said piston and within which said push rod is slidable, means biasing said piston and piston rod to a brake release position, and a latch device for controlling operative connection of said piston rod with said push rod, said latch device comprising bell crank means comprising two projecting arms and so secured to said piston rod as to be movable longitudinally therewith and also arcuately relative thereto about an axis extending transversely of and spaced apart from the push rod, latch means pivotally connected to one of the arms of said bell crank means for movement about another axis parallel to the first mentioned axis and adapted to engage the toothed portion of the push rod, unlatching means engaging the casing and acting on the other arm of said bell crank means when the piston rod is in brake release position for holding said bell crank means in a certain position for maintaining the latch means disengaged from the push rod, bias means acting on said bell crank means and effective during initial outward movement of the piston rod from brake release position to move said latch means into engagement with one of said teeth and thereafter fulcrum on said one tooth and rock relative to said one arm so as to fully seat against the thrust face of said one tooth or the tooth adjacent said one tooth, and thrust transmitting means carried by the piston rod and having a thrust surface which is so disposed as to be spaced from said latch means until said latch means is fully seated and effective during further outward movement of said piston rod following such full seating to engage said latch means and then transmit power from the piston to the push rod.

7. The combination according to claim 6, further characterized by the provision of stop means carried by said piston rod and spaced from the thrust surface of said thrust transmitting means in a direction away from said piston, second bias means interposed between said one arm of the bell crank means and said latch means for urging the latter into contact with said stop means when said bell crank means is in its said certain position, and wherein the distance between the aforementioned axes is greater than the distance between the first mentioned axis and point of contact of said unlatching pin means with said other arm of said bell crank means.

8. In a fluid pressure brake apparatus, the combination with a brake cylinder having a piston and also having a piston rod operable by said piston, and a transversely toothed push rod mounted in and projecting exteriorly of the piston rod and having a plurality of teeth each comprising a thrust face inclined from the apex of the tooth in a direction toward the piston and a non-thrust face inclined from said apex in a direction away from the piston, of a latch device comprising body means carried by the piston rod adjacent its projecting end, lever means rockably connected to said body means for arcuate movement in a direction lengthwise of the push rod, latch means pivotally connected to said lever means for arcuate movement in said lengthwise direction relative to said lever means, unlatching means normally maintaining said lever means in one position for thereby maintaining said latch means disengaged from the push rod, bias means acting on said lever means and effective during initial outward movement of the piston from a brake release position to rock said lever means from said one position for carrying said latch means into engagement with one of the push rod teeth, said latch means thereupon being operative during continued outward movement of the piston to fulcrum relative to said one tooth and pivot relative to said lever means and thereby fully seat against the thrust face and non-thrust face of adjacent teeth under action of said bias means, one of said adjacent teeth being said one tooth, and thrust transmitting means rigidly carried by said body means and having a thrust surface that during such initial and continued outward movement is spaced from said latch means and which during subsequent outward movement of the piston engages said latch means and then forces the latter against the last-mentioned thrust face for thereafter transmitting power from the piston to the push rod during further outward movement of the piston.

9. In a fluid pressure brake apparatus, the combination with a brake cylinder having a piston slidably mounted in a casing and also having a piston rod operable by said piston, and a transversely toothed push rod mounted in and projecting exteriorly of the piston rod and having a plurality of teeth each comprising a thrust face inclined from the apex of the tooth in a direction toward the piston and a non-thrust face inclined from said apex in a direction away from the piston, of a latch device comprising body means carried by the piston rod adjacent its projecting end, bell crank means carried by said body means and having two arms extending from a knee portion and fulcrumed at said knee portion for rockable movement in a direction lengthwise of the push rod, latch means pivotally connected to one of said arms for pivotal movement in said lengthwise direction relative to said one arm, unlatching means normally engaging the casing for exerting a movement on the other of said arms for rocking said bell crank means to one position for thereby maintaining said latch means disengaged from the push rod, bias means acting on said bell crank means and effective during initial outward movement of the piston from a brake release position to rock said bell crank means from said one position as said unlatching means is carried away from engagement with the casing for thereby carrying said latch means into engagement with one of the push rod teeth, said latch means being operative during continued outward movement of the piston to fulcrum on said one tooth and pivot relative to said one arm so as to fully seat against the thrust face and non-thrust face of adjacent teeth, one of said adjacent teeth being said one tooth, and thrust transmitting means rigidly carried by said body means and having a thrust surface that during such initial and continued outward movement is spaced from said latch means and which during subsequent outward movement of the piston engages said latch means and then forces the latter against the last-mentioned thrust face for thereafter transmitting power from the piston to the push rod during further outward movement of the piston.

References Cited in the file of this patent
UNITED STATES PATENTS 2,004,654     Farmer _____ June 11, 1935